(12) United States Patent
Haff

(10) Patent No.: US 12,440,130 B1
(45) Date of Patent: Oct. 14, 2025

(54) OSTOMY WAFER AND METHOD

(71) Applicant: University of Central Oklahoma, Edmond, OK (US)

(72) Inventor: Maurice Haff, Edmond, OK (US)

(73) Assignee: UNIVERSITY OF CENTRAL OKLAHOMA, Edmond, OK (US)

( * ) Notice: Subject to any disclaimer, the term of this patent is extended or adjusted under 35 U.S.C. 154(b) by 0 days.

(21) Appl. No.: 19/018,351

(22) Filed: Jan. 13, 2025

(51) Int. Cl.
| | |
|---|---|
| *A61B 5/1468* | (2006.01) |
| *A61B 5/145* | (2006.01) |
| *A61F 5/445* | (2006.01) |
| *A61F 13/42* | (2006.01) |
| *A61F 13/84* | (2006.01) |

(52) U.S. Cl.
CPC ........ *A61B 5/1468* (2013.01); *A61B 5/14546* (2013.01); *A61F 5/445* (2013.01); *A61F 13/42* (2013.01); *A61B 2562/0285* (2013.01); *A61F 2013/422* (2013.01); *A61F 2013/8473* (2013.01); *A61L 2400/12* (2013.01); *A61L 2400/14* (2013.01)

(58) Field of Classification Search
CPC ............ A61B 5/14507; A61B 5/14546; A61B 5/1468; A61B 5/1477; A61B 5/445; A61B 2010/0006; A61F 5/4401; A61F 5/443–445; A61F 2013/8473; G01N 33/52; G01N 33/525–528; G01N 2333/916; G01N 2333/95

See application file for complete search history.

(56) References Cited

U.S. PATENT DOCUMENTS

| | | | |
|---|---|---|---|
| 5,147,343 | A | 9/1992 | Kellenberger |
| 5,322,797 | A | 6/1994 | Mallow et al. |
| 6,093,276 | A | 7/2000 | Leise, Jr. et al. |
| 6,101,867 | A | 8/2000 | Cavestri |
| 6,774,800 | B2 | 8/2004 | Friedman et al. |
| 7,014,816 | B2 | 3/2006 | Miller et al. |
| 8,343,437 | B2 | 1/2013 | Patel |
| 8,707,766 | B2 | 4/2014 | Harris et al. |
| 8,978,452 | B2 | 3/2015 | Johnson et al. |
| 9,506,886 | B1 | 11/2016 | Woodbury et al. |

(Continued)

FOREIGN PATENT DOCUMENTS

| | | | |
|---|---|---|---|
| WO | WO-0000822 A1 * | 1/2000 | ............ A61L 15/56 |
| WO | 2004084778 A2 | 10/2004 | |

(Continued)

*Primary Examiner* — Tse W Chen
*Assistant Examiner* — Alice Ling Zou
(74) *Attorney, Agent, or Firm* — CALDERON SAFRAN & WRIGHT P.C.

(57) ABSTRACT

The present invention provides a sensitive, accurate, bioactive skin barrier/wafer usable in ostomy systems and wound drainage collectors for identification of pathogens at critical thresholds of presence on peristomal skin at stoma sites and exuding wounds before clinical signs and symptoms of infection present. A method of fabricating a bioactive skin barrier/wafer intended for identification of pathogen presence in ostomy systems is provided, that delivers a rapid response observable alert. The present invention utilizes biomarkers to detect pathogens in real time, where biomarkers are characteristics objectively measured as indicators of health, disease, or a response to an exposure or intervention, including therapeutic interventions.

15 Claims, 10 Drawing Sheets

(56) References Cited

U.S. PATENT DOCUMENTS

| | | |
|---|---|---|
| 9,649,230 B1 | 5/2017 | Li |
| 10,022,277 B2 | 7/2018 | Heil et al. |
| 11,208,735 B2 * | 12/2021 | Haff ............... A61K 9/0053 |
| 11,903,728 B2 | 2/2024 | Svanegaard et al. |
| 11,913,139 B2 | 2/2024 | Haff |
| 2008/0058740 A1 | 3/2008 | Sullivan et al. |
| 2008/0061965 A1 | 3/2008 | Kuhns et al. |
| 2009/0312685 A1 * | 12/2009 | Olsen ............... A61F 5/443 |
| | | 604/386 |
| 2010/0191201 A1 | 7/2010 | Bach et al. |
| 2011/0071482 A1 | 3/2011 | Selevan |
| 2015/0272495 A1 | 10/2015 | Greener |
| 2016/0267769 A1 | 9/2016 | Rokhsaz et al. |
| 2019/0252079 A1 | 8/2019 | Constantin et al. |
| 2020/0188161 A1 * | 6/2020 | Seres ............... A61F 5/445 |
| 2021/0145354 A1 | 5/2021 | Hunt et al. |
| 2022/0142807 A1 | 5/2022 | Tofte |
| 2022/0304844 A1 | 9/2022 | Carlsson et al. |
| 2023/0141719 A1 | 5/2023 | Emborg et al. |
| 2023/0142141 A1 | 5/2023 | Emborg et al. |
| 2023/0146436 A1 | 5/2023 | Hansen et al. |
| 2023/0147665 A1 | 5/2023 | Hasbeck et al. |
| 2023/0255811 A1 | 8/2023 | Carlsson et al. |
| 2023/0284932 A1 | 9/2023 | Hansen et al. |
| 2023/0293333 A1 | 9/2023 | Hansen et al. |
| 2023/0293335 A1 | 9/2023 | Hansen et al. |
| 2023/0301818 A1 | 9/2023 | Hansen et al. |
| 2023/0372141 A1 | 11/2023 | Larsen et al. |
| 2023/0414397 A1 | 12/2023 | Hansen et al. |
| 2024/0200230 A1 | 6/2024 | Haff |
| 2024/0225539 A1 | 7/2024 | Svanegaard et al. |
| 2024/0326039 A1 * | 10/2024 | Liu ............... C12Q 1/04 |

FOREIGN PATENT DOCUMENTS

| | | | |
|---|---|---|---|
| WO | 2015186452 A1 | 12/2015 | |
| WO | 2020259775 A1 | 12/2020 | |
| WO | WO-2023178051 A1 * | 9/2023 | ............... A61F 5/445 |
| WO | WO-2024186960 A1 * | 9/2024 | ......... A61L 28/0034 |

* cited by examiner

OSTOMY WAFER AND METHOD

FIELD OF THE INVENTION

The present disclosure relates generally to chromatic biosensors for use in diagnostics and detection of pathogens during use of ostomy appliances. More specifically, the present disclosure relates to monitoring for peristomal skin infections during use of ostomy appliances.

All of the, patents, patent applications, and non-patent literature that are referred to herein are incorporated by reference in their entirety as if they had each been set forth herein in full. Note that this application is one in a series of applications by the Applicant covering methods and apparatus for enabling biomedical applications of nanofibers. The term "fiber" and the term "nanofiber" as well as the terms "wafer" and "ostomy wafer" may be used interchangeably, and neither term usage is limiting. The term "wafer" also applies to and is interchangeable with the term "skin barrier" which provides essentially the same function. The term "biosensor" and the terms "chromatic biosensor" may be used interchangeably, and neither term usage is limiting. The disclosure herein goes beyond that needed to support the claims of the particular invention set forth herein. This is not to be construed that the inventor is thereby releasing the unclaimed disclosure and subject matter into the public domain. Rather, it is intended that patent applications will be filed to cover all of the subject matter disclosed below. Also, please note that the terms frequently used below "the invention" or "this invention" is not meant to be construed that there is only one invention being discussed. Instead, when the terms "the invention" or "this invention" are used, it is referring to the particular invention being discussed in the paragraph where the term is used.

BACKGROUND OF THE INVENTION

An ostomy is a surgical procedure that creates an opening (stoma) in the abdomen to allow waste to exit the body when the digestive or urinary systems are not functioning properly. There are three main types of ostomies: Colostomy which connects the colon to the abdominal wall; Ileostomy which connects the ileum (part of the small intestine) to the abdominal wall; and Urostomy which redirects urine from the ureters to the abdominal wall.

Ostomies are often necessary for individuals with conditions such as colorectal cancer, inflammatory bowel disease (like Crohn's disease and ulcerative colitis), bladder cancer, and severe abdominal or pelvic trauma. In the United States, it's estimated that over 750,000 people live with an ostomy, with around 100,000 new surgeries performed annually.

Ostomy pouching systems are available in one-piece and two-piece systems, with options for closed or drainable pouches to collect waste from a stoma. They typically include skin barriers/wafers that adhere the pouch to the peristomal skin and protect the area around the stoma. Barrier rings may also be needed to create a better seal around the stoma to prevent leaks.

An ostomy wafer, also known as a skin barrier, is a vital component of an ostomy pouching system. The primary function of an ostomy wafer is to protect the skin around the stoma (the opening created during an ostomy surgery) and to securely attach the ostomy pouch to the peristomal skin adjacent to the stoma.

To protect the peristomal skin, the wafer is designed with an adhesive layer intended to adhere to the skin around the stoma, creating a barrier that prevents the stoma's output from irritating the peristomal skin. The wafer has an adhesive side that sticks to the skin, while the other side attaches to an ostomy pouch. The wafer ensures that the pouch stays in place, allowing it to collect waste effectively.

Ostomy wafers come in various types, including pre-cut, cut-to-fit, and moldable options. This provides a wafer that closely fits a stoma size and shape. By providing a snug fit around the stoma, the wafer helps to prevent leaks, which can be a common issue for ostomy patients and increase the risk of infection. Several types of ostomy wafers are available to accommodate different stoma shapes, sizes, and individual needs. Pre-cut wafers come with a pre-cut hole that fits standard, uniform stoma sizes. They are convenient and ready to use, and provide a consistently shaped stoma opening. Cut-to-fit wafers have printed guidelines that allow users to cut the opening to match their specific stoma size and shape. This type is designed for use with irregular or changing stoma sizes. Moldable Wafers are designed to be shaped by hand to fit a stoma more precisely. They enable a custom fit without the need for cutting to achieve a secure and comfortable seal.

An ostomy appliance may be in the form of a two-piece appliance comprising an ostomy wafer and a collecting bag which may be coupled to and un-coupled from each other through a coupling, or a one-piece appliance where the ostomy wafer is permanently coupled to a collecting bag and when the collecting bag is replaced the ostomy wafer is removed from the skin surface of the user.

The stoma is usually located close to the abdominal area of the user, or it may sometimes be located elsewhere if the abdominal area is not suited for having the stoma. The stoma usually exits via an opening the abdominal wall of the user and is fixed in position by suturing a part of the stoma to the opening in the abdominal wall. This means that the area surrounding the stoma may be subjected to movements in the abdominal wall due to movements of the user, such as during exercise, bending over, bending backwards, and so on. Furthermore, the area surrounding the stoma is affected by the layers of cutaneous and sub-cutaneous tissue, such as the thickness of the skin and the thickness of fat layers, etc.

Stoma patients, in particular, are at risk of infection. Any leakage of waste leaving the body through the stoma (for example, the "stomal output") onto the peristomal skin can lead to irritant dermatitis, bacterial and fungal infections, fungal dermatitis or folliculitis.

The most common cause of infection around the stoma is poor hygiene. Failing to clean the area thoroughly and regularly can lead to the buildup of bacteria and other irritants, which can then cause inflammation and infection. Other factors that can increase the risk of infection include skin allergies, excessive moisture or dryness, and friction from ill-fitting appliances or clothing.

When an infection does occur, it is important to recognize the symptoms and seek prompt medical attention. Common signs of infection around the stoma include increased soreness, pain, redness, swelling, and discharge. However, the signs of infection often fail to present until well after pathogen load has risen above critical thresholds of presence (i.e., $10^6$ CFU/cm$^2$). Early detection and treatment are key to preventing the infection from spreading and causing further complications.

Recent advancements in "smart" ostomy sensor technologies have focused on host response to indicate moisture, skin inflammation, and infection, however, none provide direct monitoring of pathogen load. The Alfred SmartBag by 11 Health uses temperature and moisture sensors to monitor stoma output and skin conditions. The device is designed to track output levels, detect leaks, and provide real-time alerts to the user via a connected app. However, the system relies on host response to provide signs of infection by monitoring changes in skin temperature and moisture levels around the stoma. While an increase in temperature may indicate inflammation or possible infection, there is no confirmation of pathogen presence or pathogen load beyond a critical threshold. The Ostom-i Alert Sensor is a device that clips onto the bottom of an ostomy bag and monitors the fill level. It sends data to a smartphone app, providing alerts to prevent overfilling. However, the Ostom-i Alert Sensor also relies on host response by monitoring changes in stoma output, which is a fallible indicator of possible infection. There is no direct indication of pathogen load, only an indication of abnormal patterns.

Tofte in EP3930642B1 discloses is a sensor patch for attachment to a base plate for an ostomy appliance to facilitate detection of moisture propagation in the adhesive material provided for attaching the base plate to the skin surface of a user, as well as detection of increased risk of leakage. For example, the Tofte sensor patch may allow electronic measurements of performance of the base plate and/or to facilitate detection of increasing risks of leakage and/or to facilitate detection of decreasing adherence of the base plate to the skin of the user. There is no indication of monitoring for pathogens or identification of infection.

Seres, et al, disclose in U.S. Pat. No. 10,874,541 an Ostomy Monitoring System wherein an ostomy wafer can include an adhesive layer configured to adhere to skin around a stoma of a living person; a flexible sensor layer coupled with the adhesive layer, the flexible sensor layer comprising a plurality of temperature sensors; and a plurality of conductors wired to the plurality of temperature sensors, the plurality of conductors configured to be electrically coupled with an electronics hub so that signals from the plurality of temperature sensors are electrically communicated to the electronics hub. In some configurations the wafer can further include one or more capacitive sensors configured to detect moisture in adhesives of the adhesive layer. These sensors may also be positioned in an ostomy bag. The metrics measured are temperature, moisture, bag fill, leakage, skin irritation, and stoma output. The system relies on host response as an indirect (and fallible) indication of infection. There is no confirmation of pathogen presence or load.

Evaluation and management of infections experienced by patients living with an ostomy system is an essential role of interprofessional team members in collaborating to provide well-coordinated care in all care settings. The sensitive, selective, and rapid detection of clinical pathogens is a critical step in the prevention/control of pathogenic infection, and timely treatment of bacterial and fungal infections, Conventional bacterial diagnostic approaches such as swabbing, bacterial culture, morphologic analysis, biochemical staining, enzyme-linked immunosorbent assay, and polymerase chain reaction are time consuming and entail complex pretreatment procedures, and skillful technicians, all of which are impractical within the patient home setting and self-care. These conventional diagnostic approaches present significant challenges for achieving a timely treatment response in any care setting, but is particularly challenging in resource-limited at-home environments. Observation of clinical signs and symptoms is often fallible, particularly for the unpracticed care provider and patient. There is, therefore, an urgent need to develop new sensors and methods widely usable in all ostomy systems and that address the current challenges in detection and discrimination of clinically relevant concentrations of bacteria and fungi, with high specificity and sensitivity, in a short period of time (e.g., a few minutes to a few hours).

SUMMARY

Pathogenic bacteria and fungi secrete various enzymes that help them invade host tissues and evade the immune system. Some key enzymes include the following:
Pathogenic Bacteria:
1. Proteases: Break down proteins in host tissues, aiding in invasion and nutrient acquisition.
2. Lipases: Degrade lipids, helping bacteria to penetrate fatty tissues.
3. Hyaluronidase: Breaks down hyaluronic acid in connective tissues, facilitating the spread of bacteria.
4. Collagenase: Degrades collagen, a major component of connective tissues, aiding in tissue invasion.
5. Coagulase: Causes blood clotting, which can protect bacteria from immune cells.

Pathogenic Fungi:
1. Pectinases: Degrade pectin, a component of plant cell walls, facilitating tissue penetration.
2. Proteases: Similar to bacterial proteases, these break down proteins in host tissues.
3. Lipases: Help fungi to degrade lipids and invade fatty tissues.
4. Chitinases: Break down chitin, a component of fungal cell walls, which can help in remodeling fungal structures during infection.

These enzymes play crucial roles in the pathogenicity of bacteria and fungi, enabling them to infect and cause disease in their host. Dyes responsive to these enzymes can be used to indicate though a color-change the presence of pathogens in a wound or on human skin. Organic dyes responsive to pathogenic enzymes, such as proteases and lipases, are designed to undergo a visible color change upon interaction with these enzymes.

Fluorogenic dyes emit fluorescence upon cleavage by specific enzymes. For instance, MCA (7-methoxycoumarin-4-acetic acid) and EDANS (5-((2-aminoethyl)amino)naphthalene-1-sulfonic acid) are used in fluorogenic assays to study inflammatory caspases. When these enzymes cleave the dye-substrate complex, a fluorescence signal is emitted, indicating enzyme activity.

Azo dyes exhibit vibrant colors and can change color in response to enzymatic activity. Enzymes such as laccases and peroxidases can break down azo dyes, leading to a visible color change. This property is utilized in bioremediation processes to monitor the degradation of pollutants.

Peptide-Based Dyes: These dyes are engineered to include specific peptide sequences recognized by target proteases. When the protease cleaves the peptide, the dye undergoes a structural change, resulting in a visible color shift. This approach is useful for detecting protease activity in various biological samples.

Ester-Containing Dyes: Dyes with ester bonds can be cleaved by lipases, leading to a color change. This property is particularly useful in monitoring lipase activity in conditions such as pancreatitis.

It is an object of the present invention to provide a sensitive, accurate, and rapid method and bioactive skin barrier/wafer usable in any ostomy system for identification of pathogens at critical thresholds of presence at stoma sites before clinical signs and symptoms of infection present.

It is an object of the present invention to obviate at least one disadvantage of previous methods intended for identification of pathogen presence in ostomy systems, including at least providing universal application in standard ostomy systems and wound drainage collectors, detection of multiple pathogens, and a rapid response observable alert.

It is an object of the present invention to utilize biomarkers to detect pathogens in real time, where biomarkers are characteristics objectively measured as indicators of health, disease, or a response to an exposure or intervention, including therapeutic interventions.

In one aspect, the present invention provides an ostomy wafer monitoring device comprising a chromatic biosensor responsive to the presence of at least one pathogenic biomarker, the biosensor adapted to provide a visual color-change indication when the biomarker is present in bodily fluids exposed to the biosensor positioned on a skin barrier/wafer.

In one aspect, the present invention provides an ostomy wafer incorporating a monitoring device comprising a chromatic biosensor responsive to the presence of at least one pathogenic biomarker, the biosensor adapted to provide a visual color-change indication when the biomarker is present in bodily fluids exposed to the biosensor.

In another aspect, the biosensor on the wafer takes the form of a closed line shape, such as a ring, an ellipse or a polygon and may surround the ostomy receiving opening of the wafer in its entirety.

In another aspect, the biosensor is adapted to form a stomal opening with a center point. The stomal opening is configured to allow passage of output through the stomal opening and into an ostomy pouch attached to the wafer without contact with the output.

In another aspect, the biosensor is adapted to allow placement on the proximal side wafer prior to fitting the wafer over a stoma, where the proximal side of the wafer may be configured to adhere to the peristomal skin.

In another aspect, the biosensor may be embedded within the adhesive layer of the ostomy wafer so that the wafer coupled with the biosensor can be applied in a single step.

In another aspect, the biosensor comprises a nanofiber membrane adapted to exhibit a color-change response to the presence of at least one biomarker.

In another aspect, the biomarker is a pathogenic enzyme.

In another aspect, the biosensor incorporates an organic dye responsive to a pathogenic enzyme.

In another aspect, the biomarker is at least the pathogenic enzyme protease or lipase.

In another aspect, the biosensor incorporates an organic dye responsive to pathogenic lipase.

In another aspect, the biosensor may further comprise an absorbent layer of natural or synthetic material.

In another aspect, the biosensor may further comprise an absorbent layer positionable on an ostomy wafer adjacent to the proximal side to enable direct contact of the biosensor with peristomal skin.

In another aspect, the organic dye exhibits a color-change response when exposed to pathogenic lipase.

In another aspect, the organic dye may exhibit a color-change from yellow to green, purple to red, blue to red or other distinctly contrasting colors.

In another aspect, the biosensor may further comprise an absorbent layer infused with a prodrug responsive to an enzyme.

In another aspect, the biosensor may further comprise an absorbent layer infused with a prodrug responsive to at least pathogenic lipase.

In another aspect, the biosensor may further comprise an absorbent layer infused with nanoparticles responsive to reactive oxygen species and encapsulating an antimicrobial.

In another aspect, a color-change response of the biosensor is visible though a transparent or semi-transparent wafer.

In another aspect, a color-change response of the biosensor is observable when a wafer is separated from the peristomal skin.

In another aspect, the biosensor comprises biocompatible polymers such as polyurethane (PU) and analogs thereof formed as core-shell nanofibers, and a hemicyanine-based chromogenic probe surface localized in the core-shell nanofiber.

In another aspect, the biosensor is formed as a membrane comprising at least three adjacent layers of nanofibers, each layer comprising a plurality of aligned nanofibers oriented at oblique angles relative to nanofibers in adjacent layers.

In another aspect, the biosensor comprises a plurality of aligned nanofibers in each layer that cross a plurality of aligned nanofibers in adjacent layers at a plurality of distinct points of intersection, forming a crossing at each distinct point of intersection consisting of three crossing nanofibers extending directionally as six radials from each distinct point of intersection, In another aspect, a plurality of nanofibers in each layer of the biosensor cross at relative cross-alignment angles between six radials at each distinct point of intersection in the range of 50 to 70 degrees.

In another aspect, the hemicyanine-based chromogenic probe further comprises a labile ester linkage that is enzymatically cleavable by pathogenic lipase released from clinically relevant strains of bacteria and fungi.

BRIEF DESCRIPTION OF THE DRAWINGS

Embodiments of the present disclosure will now be described, by way of example only, with reference to the attached Figures. The components, their geometries and configurations shown are illustrative and not to be construed as limiting.

DETAILED DESCRIPTION OF PREFERRED EMBODIMENTS OF THE INVENTION

In Brief:

The present invention obviates previous methods intended for identification of pathogen presence in ostomy systems, including by at least providing universal application in standard ostomy wafers and fluid drainage devices (including wound drainage devices) enabling detection of multiple pathogens, and a rapid response observable alert. Conventional bacterial diagnostic approaches such as swabbing, bacterial culture, morphologic analysis, biochemical staining, enzyme-linked immunosorbent assay, and polymerase chain reaction are time consuming and entail complex pretreatment procedures, and skillful technicians, all of which are impractical within the patient home setting and self-care. These conventional diagnostic approaches present significant challenges for achieving a timely treatment response in any care setting, but is particularly challenging in resource-limited at-home environments. Observation of clinical signs and symptoms is often fallible, particularly for the unpracticed care provider and patient. The present invention provides sensitive, selective, and rapid detection of clinically relevant pathogens, which is a critical step in the prevention/control of pathogenic infection, and timely treatment of bacterial and fungal infections.

The present invention utilizes unique biomarkers to detect pathogens in real time, where biomarkers are characteristics objectively measured as indicators of health, disease, or a response to an exposure or intervention, including therapeutic interventions. In a preferred embodiment, the present invention provides an ostomy wafer monitoring device and method comprising a biosensor responsive to the presence of at least one unique pathogenic biomarker. The biosensor is adapted to provide a visual indication when the biomarker is present in bodily fluids exposed to the biosensor. The biosensor may be positioned on the wafer by the user before wafer application. Alternatively, the biosensor may be positioned on the wafer as an integrated element of the wafer during wafer manufacture. Other applications, including use as a skin barrier in wound drainage collectors available from Hollister, Eakin, et al., will be apparent to those skilled in the related art.

Figure 1:
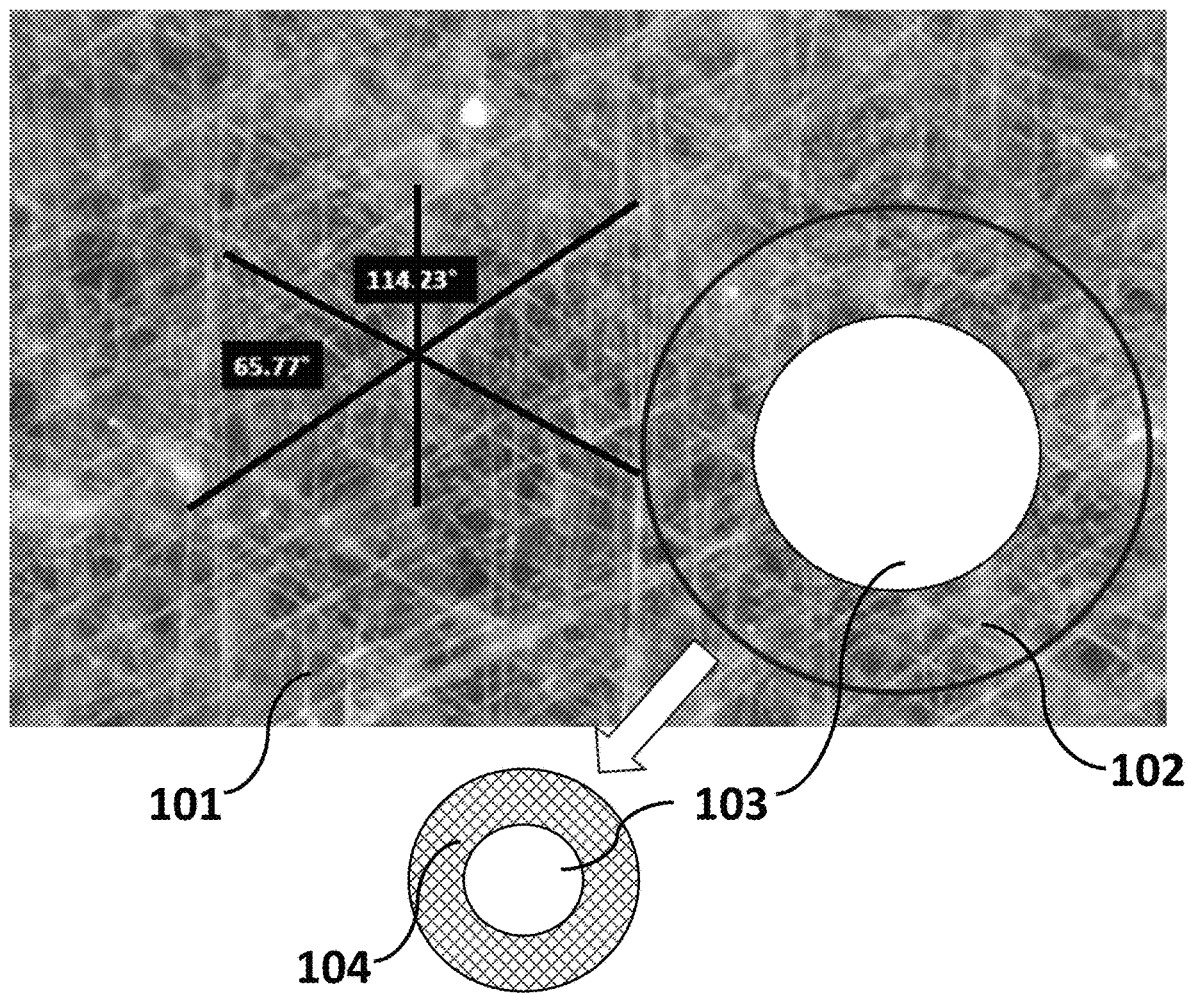
FIG. 1 shows a non-limiting diagram of the biosensor fiber structure of the ostomy wafer monitoring device of the present invention cut from a magnified image of a larger nanofiber membrane.

FIG. 1 shows a non-limiting diagram of the biosensor fiber structure of the ostomy wafer monitoring device of the present invention cut from a magnified image of a larger nanofiber membrane. The membrane as shown is a 360× magnified image of a nanofiber membrane as disclosed in U.S. Pat. No. 11,913,139 and continuation Ser. No. 18/442, 805 by the same inventor hereof. The separated biosensor to be positioned on an ostomy wafer takes the form of a closed line shape, shown as a ring, and may be cut as ellipse or a polygon to adapt to and surround a stoma receiving the stomal opening of the ostomy wafer. A separated biosensor is adapted to be formed with a stomal opening at a center point. The stomal opening is configured to allow passage of output through the stomal opening and into an ostomy pouch attached to the wafer without contact with the output. A biosensor cut from the larger nanofiber membrane shares the aspects of the membrane comprising at least a plurality of aligned nanofibers in each of multiple layers that cross a plurality of aligned nanofibers in adjacent layers at a plurality of distinct points of intersection, forming a crossing at each distinct point of intersection consisting of three crossing nanofibers extending directionally as six radials from each distinct point of intersection, where a plurality of nanofibers in each layer of the biosensor cross at relative cross-alignment angles between six radials at each distinct point of intersection in the range of 50 to 70 degrees. The nanofiber membrane may incorporate an organic dye responsive to a pathogenic enzyme. Further, a chromogenic probe comprising a bioactive dye such as but not limited to a hemicyanine-based dye may be included in the nanofiber membrane. A hemicyanine-based dye comprising a labile ester linkage is enzymatically cleavable by a biomarker released from clinically relevant strains of bacteria and fungi. The biosensor comprises aspects of the lager nanofiber membrane adapted to exhibit a color-change response to the presence of at least one biomarker, where the biomarker is a pathogenic enzyme. The pathogenic enzymes may include at least one of protease and lipase. The organic dye may be selected to exhibit a color-change from yellow to green, purple to red, blue to red or other distinctly contrasting colors in response to enzymes secreted by clinically relevant pathogens. The biosensor exhibits an initial color such as yellow and transitions to a different color such as green or red when exposed to pathogenic enzymes.

Figure 2:
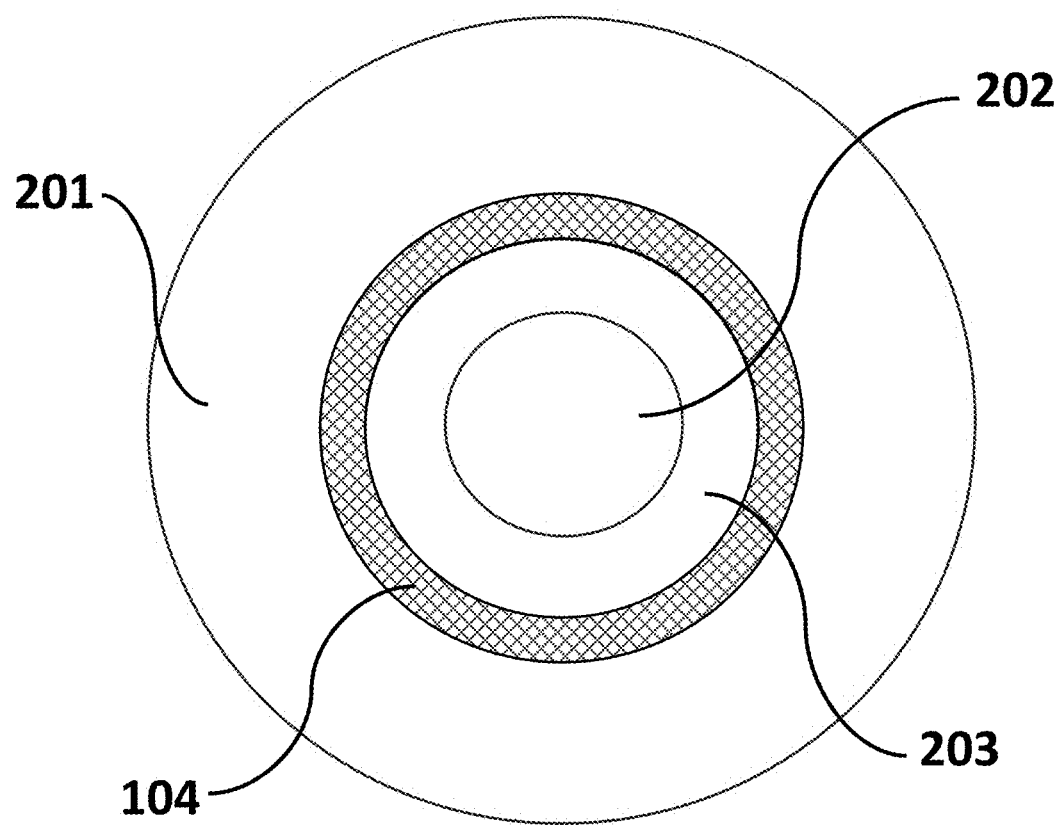
FIG. 2 shows a non-limiting diagram of the biosensor of the ostomy wafer monitoring device positioned on a pre-cut ostomy wafer.

FIG. 2 shows a non-limiting diagram of the biosensor of the ostomy wafer monitoring device positioned on a pre-cut ostomy wafer. The biosensor is adapted to allow placement by the user on the proximal side of an ostomy wafer prior to fitting the wafer over a stoma, where the proximal side of the wafer is configured to adhere to the peristomal skin. The biosensor may also be embedded within an adhesive layer of an ostomy wafer during manufacture of the ostomy wafer so that the wafer coupled with the biosensor can be applied in a single step by a user. The biosensor is adapted to be formed with a stomal opening at a center point. The stomal opening is configured to allow passage of output through the stomal opening and into an ostomy pouch attached to the wafer without contact with the output. The stomal opening at a center point of the biosensor is sized with a diameter greater than the diameter of the stomal opening of the ostomy wafer to provide a boundary area on the adhesive layer of the ostomy wafer to contact peristomal skin.

Figure 3:
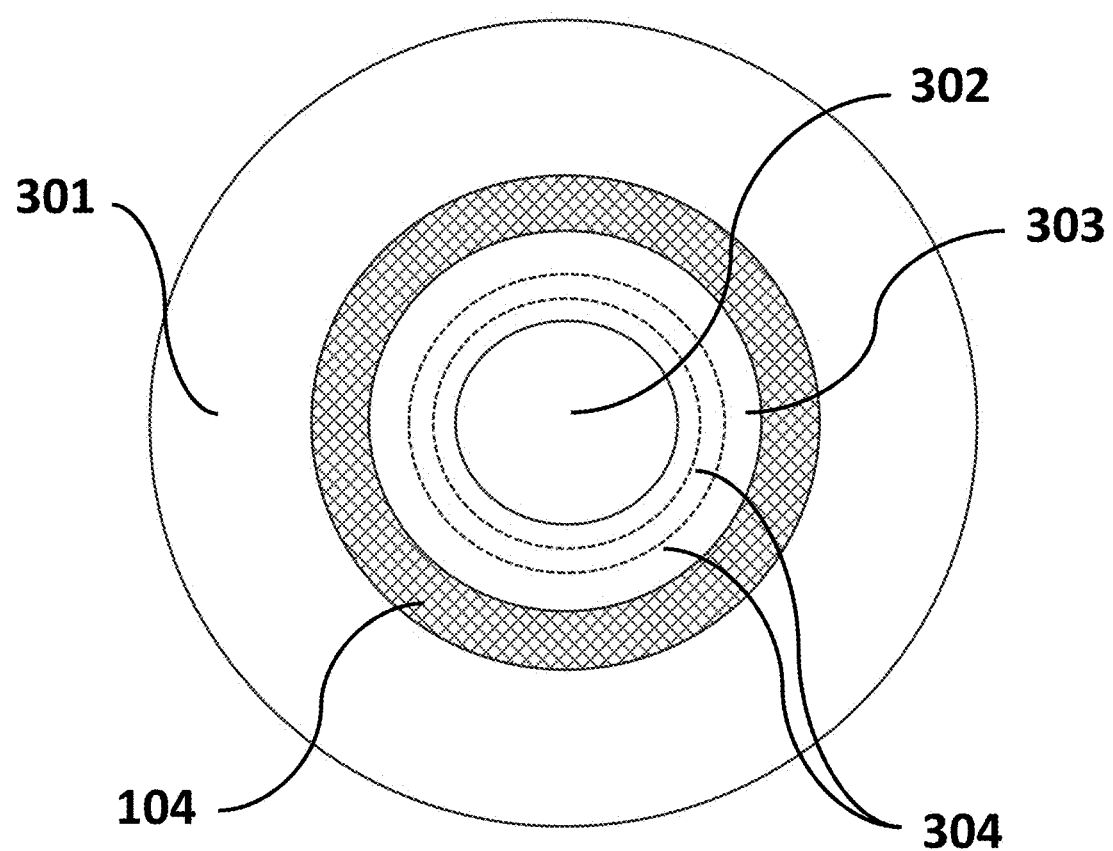
FIG. 3 shows a non-limiting diagram of the biosensor of the ostomy wafer monitoring device positioned on a cut-to-fit ostomy wafer.

FIG. 3 shows a non-limiting diagram of the biosensor of the ostomy wafer monitoring device positioned on a cut-to-fit ostomy wafer. The biosensor is adapted to allow placement on the proximal side of the wafer by the user prior to fitting the wafer over a stoma, where the proximal side of the wafer may be configured to adhere to the peristomal skin. The biosensor may also be embedded within the adhesive layer during manufacture of the ostomy wafer so that the wafer coupled with the biosensor can be applied in a single step. The biosensor is adapted to be formed with a stomal opening at a center point. The stomal opening is configured to allow passage of output through the stomal opening and into an ostomy pouch attached to the wafer without contact with the output. The stomal opening at a center point of the biosensor is sized with a diameter greater than the largest cut-to-fit diameter of the stomal opening of the ostomy wafer to provide a boundary area on the adhesive layer of the ostomy wafer to contact peristomal skin.

Figure 4:
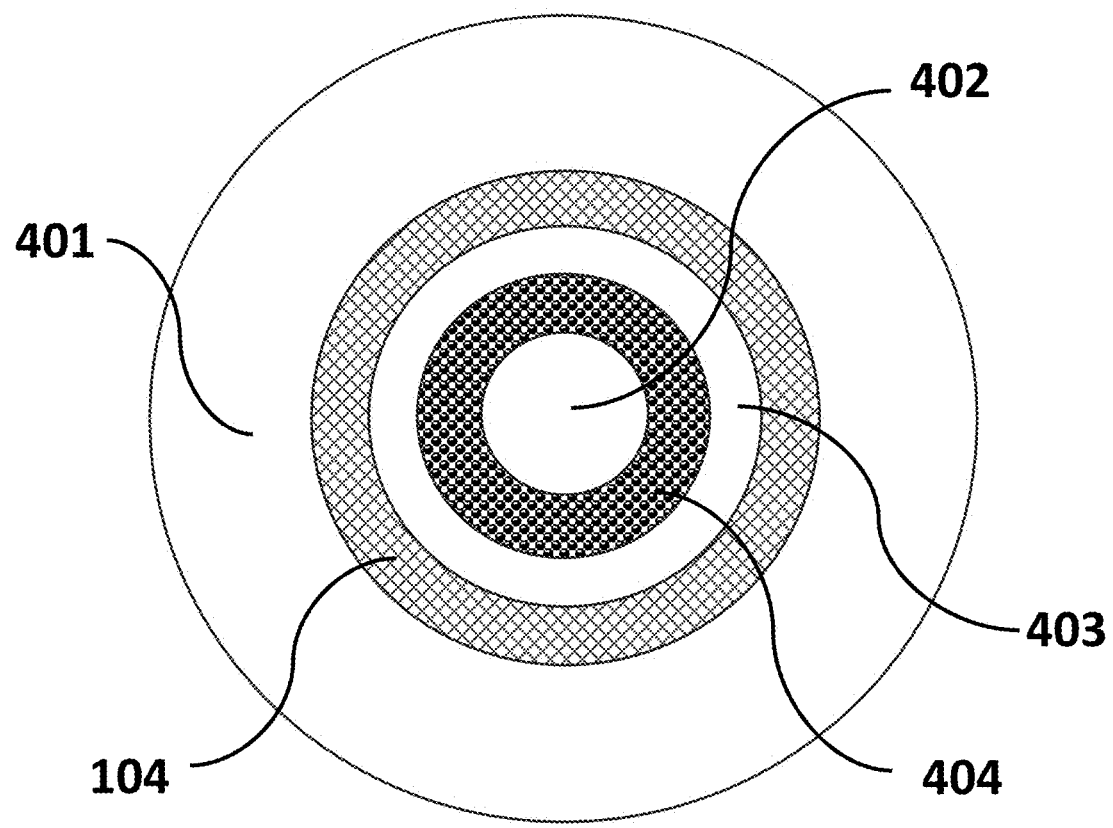
FIG. 4. shows a non-limiting diagram of the biosensor of the ostomy wafer monitoring device positioned on a moldable ostomy wafer.

FIG. 4. shows a non-limiting diagram of the biosensor of the ostomy wafer monitoring device positioned on a moldable ostomy wafer. The biosensor is adapted to allow placement on the proximal side of the wafer by the user prior to fitting the wafer over a stoma, where the proximal side of the wafer may be configured to adhere to the peristomal skin. The biosensor may also be embedded within the adhesive layer during manufacture of the ostomy wafer so that the wafer coupled with the biosensor can be applied in a single step. The biosensor is adapted to be formed with a stomal opening at a center point. The stomal opening is configured to allow passage of output through the stomal opening and into an ostomy pouch attached to the wafer without contact with the output. The stomal opening at a center point of the biosensor is sized with a diameter greater than the largest moldable diameter of the stomal opening of the ostomy wafer to provide a boundary area on the adhesive layer of the ostomy wafer to contact peristomal skin.

Figure 5:
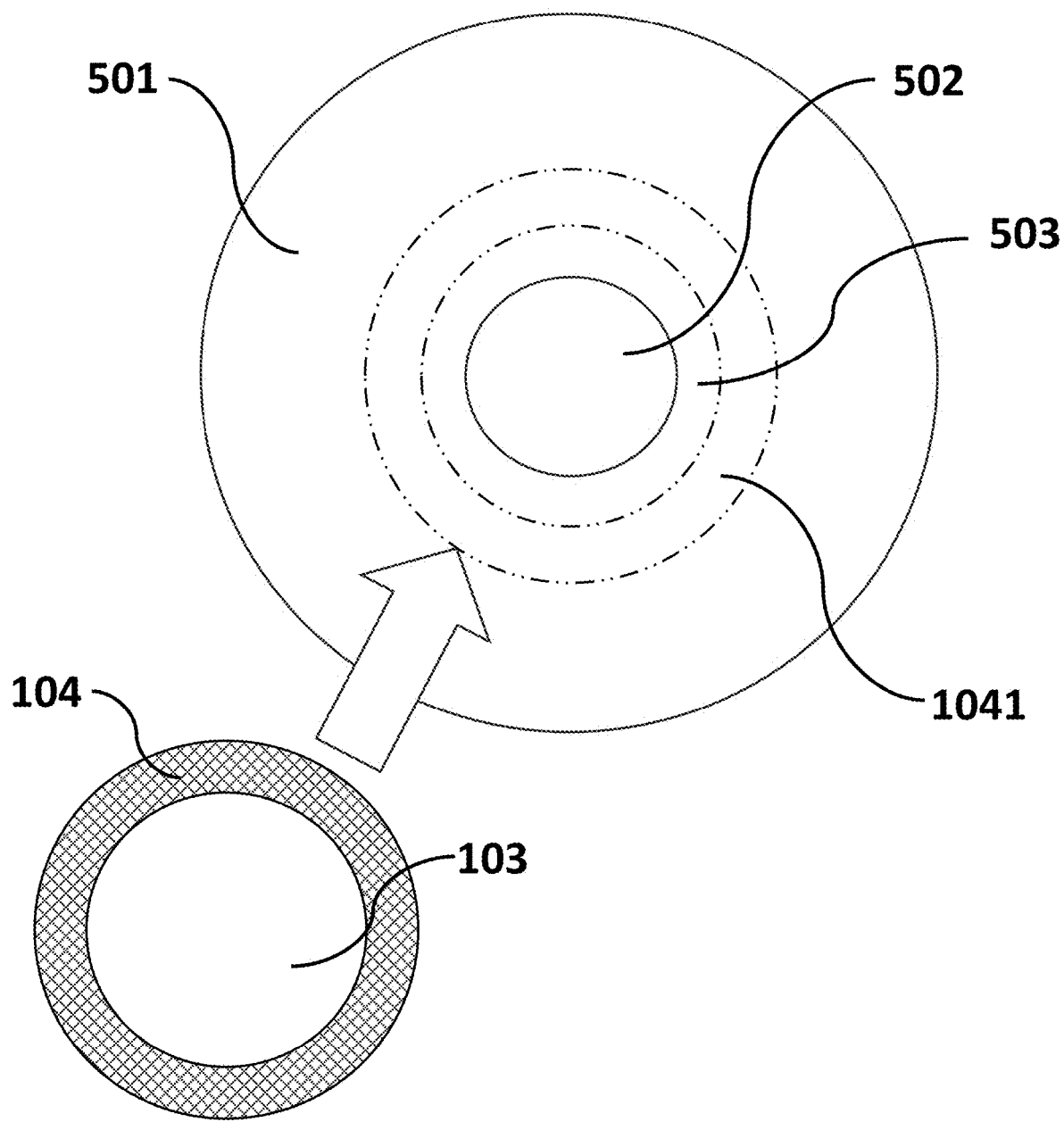
FIG. 5 shows a non-limiting diagram of the biosensor of the ostomy wafer monitoring device positioned for placement on an ostomy wafer.

FIG. 5 shows a non-limiting diagram of the biosensor of the ostomy wafer monitoring device positioned for placement on an ostomy wafer. The biosensor is adapted to allow placement on the proximal side of the wafer by the user prior to fitting the wafer over a stoma, where the proximal side of the wafer may be configured to adhere to the peristomal skin. The biosensor may be positioned on the adhesive layer of the ostomy wafer so that the wafer coupled with the biosensor can be applied in a single step. The biosensor is adapted to be formed with a stomal opening at a center point. The stomal opening is configured to allow passage of output through the stomal opening and into an ostomy pouch attached to the wafer without contact with the output. The stomal opening at a center point of the biosensor is sized with a diameter greater than the largest diameter of the stomal opening of the ostomy wafer to provide a boundary area on the adhesive layer of the ostomy wafer to contact peristomal skin.

Figure 6:
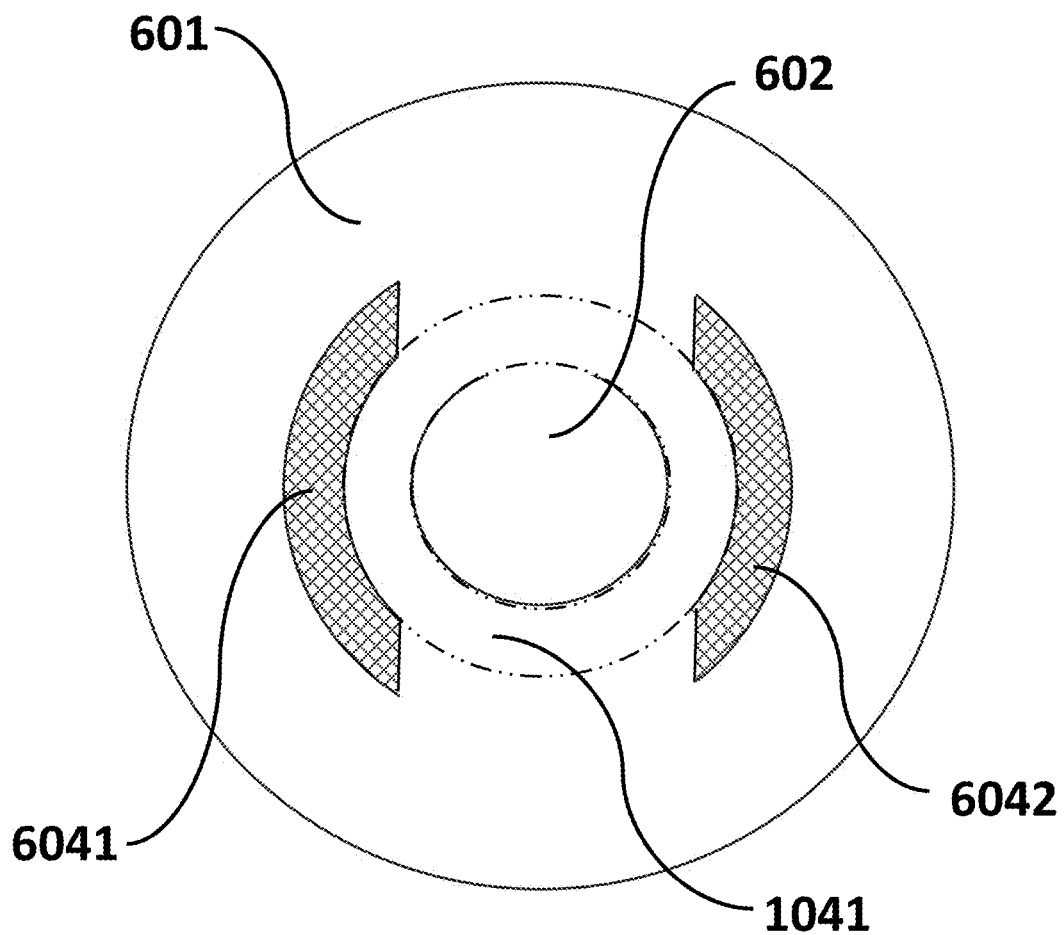
FIG. 6 shows a non-limiting diagram of the biosensor of the ostomy wafer monitoring device positioned fractionally on an ostomy wafer.

FIG. 6 shows a non-limiting diagram of the biosensor of the ostomy wafer monitoring device positioned fractionally on an ostomy wafer. The biosensor is adapted to allow placement of fractional elements of the biosensor on the proximal side of the wafer by the user prior to fitting the wafer over a stoma, where the proximal side of the wafer may be configured to adhere to the peristomal skin. The biosensor may also be fractionally embedded within the adhesive layer during manufacture of the ostomy wafer so that the wafer coupled with the biosensor can be applied in a single step. Fractional elements may be configured in various geometric shapes. The fractional elements of the biosensor may be placed circumferentially around a stomal opening, or placed asymmetrically on the proximal side of the ostomy wafer. The fractional elements of the biosensor may be positioned to provide a boundary area sized as needed around the stomal opening of the ostomy wafer on the adhesive layer to enable contact with peristomal skin.

Figure 7:
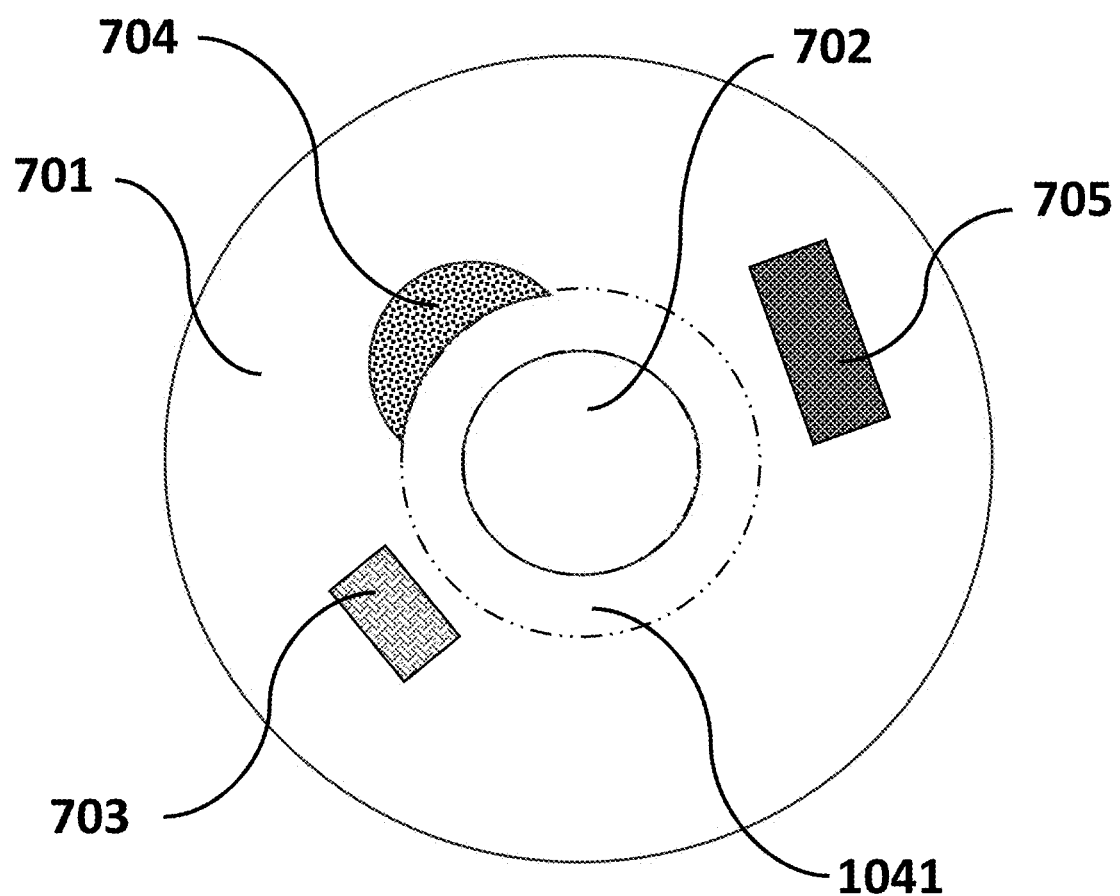
FIG. 7 shows a non-limiting diagram of the biosensor of the ostomy wafer monitoring device positioned asymmetrically on an ostomy wafer.

FIG. 7 shows a non-limiting diagram of the biosensor of the ostomy wafer monitoring device positioned asymmetrically on an ostomy wafer. The biosensor may be adapted to allow asymmetrically placement of the biosensor on the proximal side wafer by the user prior to fitting the wafer over a stoma, where the proximal side of the wafer may be configured to adhere to the peristomal skin. The biosensor may also be asymmetrically embedded within the adhesive layer during manufacture of the ostomy wafer so that the wafer coupled with the biosensor can be applied in a single step. The biosensor may be configured in various geometric shapes that enable asymmetric placement on the proximal side of the ostomy wafer and positioned to provide a boundary area around the stomal opening of the ostomy wafer on the adhesive layer to enable contact with peristomal skin.

Figure 8:
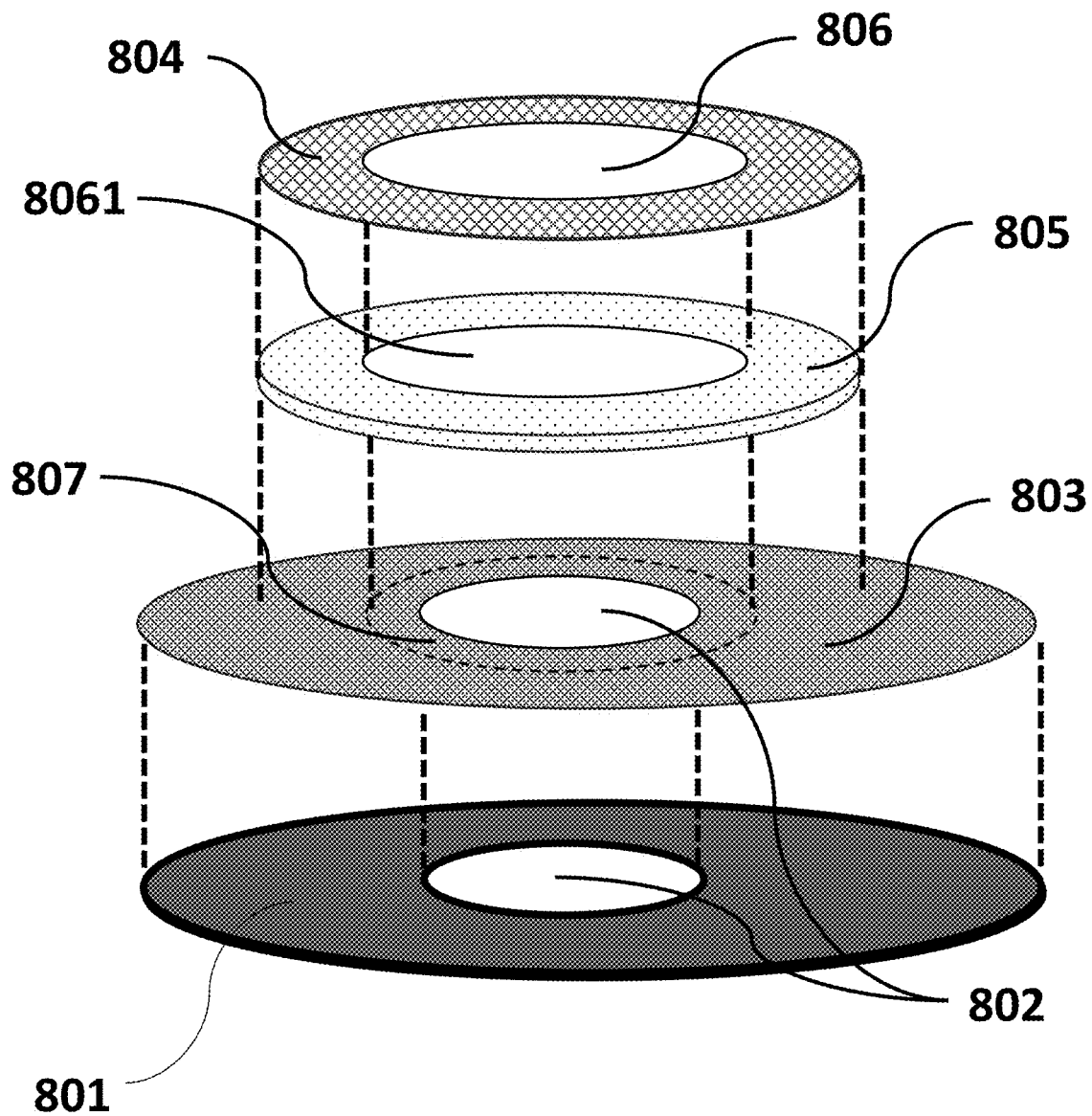
FIG. 8 shows a non-limiting diagram of an exploded view of the bioactive wafer incorporating the biosensor positioned symmetrically on an ostomy wafer, including an absorbent layer and an adhesive layer.

FIG. 8 shows a non-limiting diagram of an exploded view of the biosensor of the ostomy wafer monitoring device to be positioned symmetrically during manufacture around a stomal opening on an ostomy wafer, and including an absorbent layer and an adhesive layer. The nanofiber membrane of the biosensor may be applied to or embedded into the adhesive layer on the proximal side toward the peristomal skin and the wafer used without the absorbent layer. The nanofiber membrane of the biosensor may also be electrospun directly onto the absorbent layer and the absorbent layer applied to the adhesive layer maintaining the nanofibers on the proximal side toward the peristomal skin.

Figure 9:
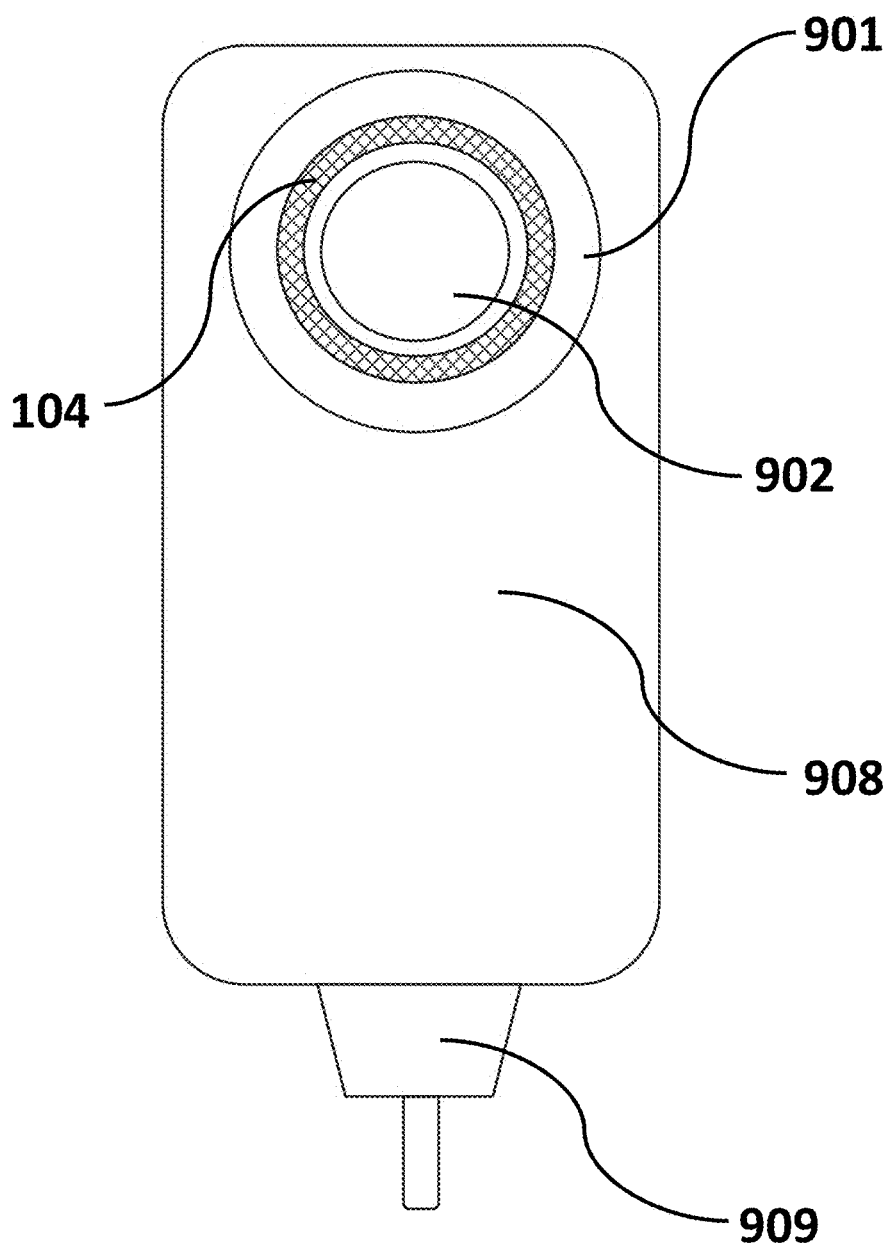
FIG. 9 shows a non-limiting diagram of the biosensor of the skin barrier/wafer monitoring device attached to an ostomy bag.

FIG. 9 shows a non-limiting diagram of the biosensor of the skin barrier/wafer monitoring device attached to an ostomy bag with a drain. The biosensor may be positioned on the skin barrier/wafer of a one-piece or a two-piece ostomy system.

Figure 10:
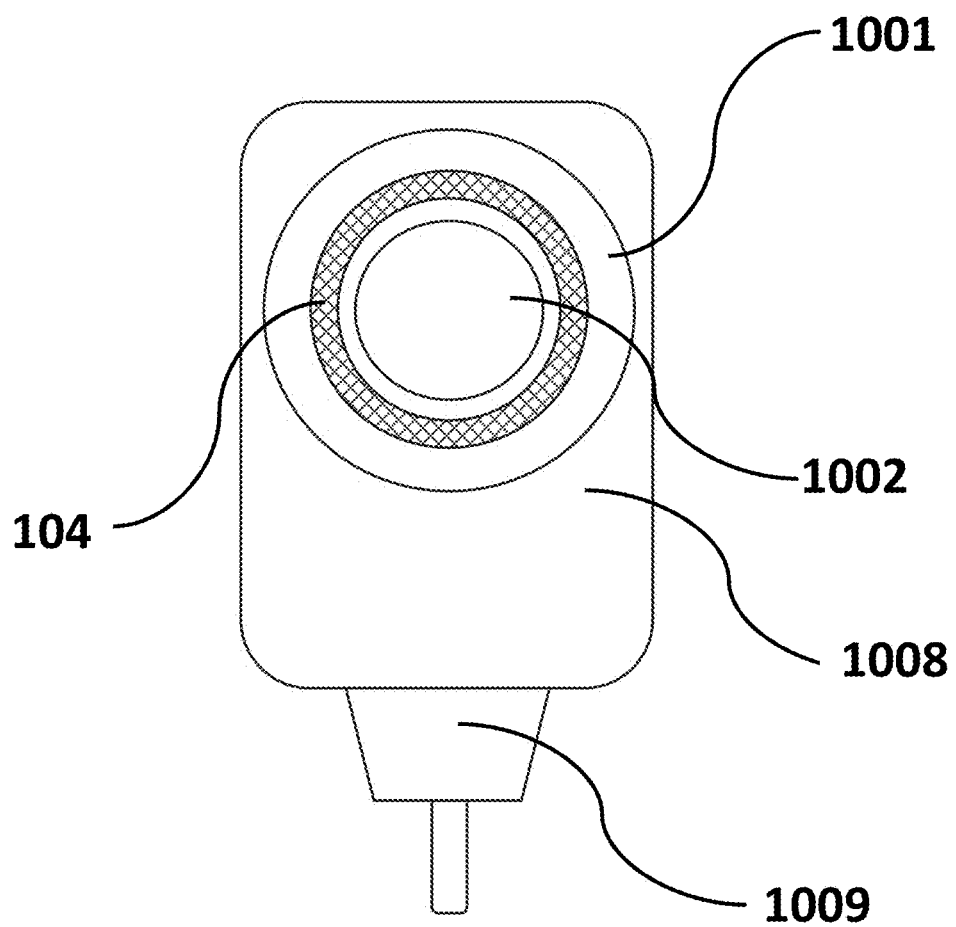
FIG. 10 shows a non-limiting diagram of the biosensor of the skin barrier/wafer monitoring device attached to a wound drainage collector.

FIG. 10 shows a non-limiting diagram of the biosensor of the skin barrier/wafer monitoring device attached to a wound drainage collector. The biosensor may be positioned on the skin barrier/wafer of a one-piece or a two-piece wound drainage collector.

in Detail:

Preferred embodiments of the present disclosure will now be described with reference to the attached Figures. The components, their geometries, configurations and positioning shown are illustrative and not to be construed as limiting.

FIG. 1 shows a non-limiting diagram of the fiber structure of the biosensor 104 comprising the ostomy wafer monitoring device cut from a portion 102 of a larger (not to scale) nanofiber membrane 101. The membrane 101 as shown is a 360× magnified image of a nanofiber membrane 101 as disclosed in U.S. Pat. No. 11,913,139 and continuation Ser. No. 18/442,805 by the same inventor hereof. In a preferred embodiment, the separated biosensor 104 may comprise a bioactive dye responsive to the enzyme lipase or protease, positionable on an ostomy wafer (not shown) takes the form of a closed line shape, shown as a ring with stomal opening 103, and may be cut as an ellipse or a polygon to adapt to and surround a stoma receiving the stomal opening of an ostomy wafer. A separated biosensor 104 is adapted to be formed with a stomal opening 103 at a center point. The stomal opening 103 is configured to allow passage of output through the stomal opening 103 and into an ostomy pouch (not shown) attached to an ostomy wafer (FIG. 2, 201) without contact with the output. The biosensor 104 cut from the larger nanofiber membrane 101 shares the aspects of the membrane 101 comprising at least a plurality of aligned nanofibers in each of multiple layers that cross a plurality of aligned nanofibers in adjacent layers at a plurality of distinct points of intersection, forming a crossing at each distinct point of intersection consisting of three crossing nanofibers extending directionally as six radials from each distinct point of intersection, where a plurality of nanofibers in each layer of the biosensor cross at relative cross-alignment angles between six radials at each distinct point of intersection in the range of 50 to 70 degrees. Further, a hemicyanine-based chromogenic probe may be included in the nanofiber membrane 101 comprising a labile ester linkage that is enzymatically cleavable by a biomarker released from clinically relevant strains of bacteria and fungi. The nanofiber membrane 101 may incorporate an organic dye to form the chromogenic probe responsive to a pathogenic enzyme. The biosensor 104 comprises aspects of the lager nanofiber membrane 101 adapted to exhibit a color-change response to the presence of at least one biomarker, where the biomarker is a pathogenic enzyme. The pathogenic enzymes may include at least one of protease and lipase. The organic dye may be selected to exhibit a color-change from yellow to green, purple to red, blue to red or other distinctly contrasting colors in response to enzymes secreted by clinically relevant pathogens.

FIG. 2 shows a non-limiting diagram of the biosensor 104 comprising the ostomy wafer monitoring device positioned on a pre-cut ostomy wafer 201. The biosensor 104 may be adapted to allow placement by the user on the proximal side of the pre-cut ostomy wafer 201 prior to fitting the wafer 201 over a stoma (not shown), where the proximal side of the wafer 201 is configured to adhere to the peristomal skin. The biosensor 104 may also be embedded within an adhesive layer during manufacture of the ostomy wafer 201 so that the wafer 201 coupled with the biosensor 104 can be applied in a single step by a user. The biosensor 104 may be adapted to be formed with a stomal opening (FIG. 1, 103) at a center point. The stomal opening (FIG. 1, 103) is configured to allow passage of output through the stomal opening of the ostomy wafer 201 and into an ostomy pouch (not shown) attached to the ostomy wafer 201 without contact with the output. The stomal opening (FIG. 1, 103) at a center point of the biosensor 104 is sized with a diameter greater than the diameter of the stomal opening 202 of the ostomy wafer 201 to provide a boundary area 203 on the adhesive layer of the ostomy wafer 201 to contact peristomal skin.

FIG. 3 shows a non-limiting diagram of the biosensor 104 comprising the ostomy wafer monitoring device positioned on a cut-to-fit ostomy wafer 301, where the stomal opening 302 may be enlarged to fit a stoma. The biosensor 104 is adapted to allow placement on the proximal side of the ostomy wafer 301 by the user prior to fitting the wafer 301 over a stoma (not shown), where the proximal side of the ostomy wafer 301 may be configured to adhere to the peristomal skin. The biosensor 104 may also be embedded within an adhesive layer on the ostomy wafer 301 during manufacture of the ostomy wafer 301 so that the wafer 301 coupled with the biosensor 104 can be applied in a single step. The biosensor 104 may be formed with a stomal opening (FIG. 1, 103) at a center point. The stomal opening 302 of the wafer 301 is configured to allow passage of output through the stomal opening 302 and into an ostomy pouch (not shown) attached to the ostomy wafer 301 without contact with the output. The stomal opening (FIG. 1, 103) at a center point of the biosensor 104 may be sized with a diameter greater than the largest cut-to-fit diameter 304 of the stomal opening 302 of an ostomy wafer 301 to provide a boundary area 303 on the adhesive layer of the ostomy wafer 301 to contact peristomal skin.

FIG. 4. shows a non-limiting diagram of the biosensor 104 comprising the ostomy wafer monitoring device positioned on a moldable ostomy wafer 401, where the stomal opening 402 may be reshaped to fit a stoma. The biosensor 104 may be adapted to allow placement on the proximal side of the ostomy wafer 401 by the user prior to fitting the wafer 401 over a stoma, where the proximal side of the wafer 401 may be configured to adhere to the peristomal skin. The biosensor 104 may also be embedded within an adhesive layer during manufacture of the ostomy wafer 401 so that the wafer 401 coupled with the biosensor 104 can be applied in a single step. The biosensor 104 may be formed with a stomal opening (FIG. 1, 103) at a center point. The stomal opening (FIG. 1, 103) of the biosensor 104 is configured to allow passage of output through the stomal opening 402 of an ostomy wafer 401 and into an ostomy pouch (not shown) attached to the wafer 401 without contact with the output. The stomal opening (FIG. 1, 103) at a center point of the biosensor 104 is sized with a diameter greater than the largest moldable diameter of the moldable portion 404 of a stomal opening 402 of the ostomy wafer 401 to provide a boundary area 403 on the adhesive layer of the ostomy wafer 401 to contact peristomal skin.

FIG. 5 shows a non-limiting diagram of the biosensor 104 comprising the ostomy wafer monitoring device positioned for placement on an ostomy wafer 501. The biosensor 104 as shown is adapted to allow placement on the proximal side of the ostomy wafer 501 in the placement area 1041 by the user prior to fitting the wafer 501 over a stoma (not shown), where the proximal side of the wafer 501 may be configured to adhere to the peristomal skin. The biosensor 104 may be positioned in a placement area 1041 on the ostomy wafer 501 on an adhesive layer of the ostomy wafer 501 during fabrication of the wafer 501 so that the wafer 501 coupled with the biosensor 104 can be applied in a single step. The biosensor 104 may be formed with a stomal opening 103 at a center point. The stomal opening 103 of a biosensor 104 is configured to allow passage of output through the stomal opening 502 of an ostomy wafer 501 and into an ostomy pouch (not shown) attached to the wafer 502 without contact with the output. The stomal opening 103 at a center point of the biosensor 104 is sized with a diameter greater than the largest diameter of the stomal opening 502 of an ostomy wafer to provide a boundary area 503 on the proximal adhesive layer of the ostomy wafer 501 to contact peristomal skin.

FIG. 6 shows a non-limiting diagram of the biosensor (FIG. 5, 104) in two separate parts 6041 and 6042 comprising the ostomy wafer monitoring device positioned fractionally on an ostomy wafer 601. The first part of the biosensor 6041 may be configured to be functionally equivalent to the second part 6042. Alternatively, the first part 6041 and the second part 6042 may be configured to respond to different enzymes. By way of example the first part of the biosensor 6041 may be responsive to lipase and the second part 6042 may be configured to respond to protease. The first part 6041 and the second part 6042 are adapted to allow placement of fractional the elements of the biosensor 6041 and 6042 on the proximal side of the ostomy wafer 601 by the user prior to fitting the wafer over a stoma, where the proximal side of the wafer may be configured to adhere to the peristomal skin. The two parts of the biosensor 6041 and 6042 may also be fractionally embedded within the adhesive layer during manufacture of the ostomy wafer 601 so that the wafer 601 coupled with both parts of the biosensor 6041 and 6042 can be applied in a single step. Fractional elements may be configured in various geometric shapes. Fractional elements of the biosensor 6041 and 6042 and a plurality of others (as shown in FIG. 7) may be placed circumferentially around a stomal opening 602 or placed asymmetrically on the proximal side of the ostomy wafer 601 and positioned to provide a boundary area 1041 around the stomal opening 602 of the ostomy wafer 601 on an adhesive layer to enable contact with peristomal skin.

FIG. 7 shows a non-limiting diagram of a multipart biosensor 703, 704, 705 configured as a plurality of different elements comprising the ostomy wafer monitoring device positioned asymmetrically on an ostomy wafer 701. The multipart biosensor 703, 704, 705 may be adapted to allow asymmetric or symmetric placement of the multipart biosensor 703, 704, 705 on the proximal side wafer 701 by the user prior to fitting the wafer 701 over a stoma (not shown), where the proximal side of the wafer 701 may be configured to adhere to the peristomal skin. The multipart biosensor 703, 704, 705 may also be asymmetrically or symmetrically embedded within the adhesive layer of the ostomy wafer 701 during manufacture of the wafer 701 so that the wafer 701 coupled with the multipart biosensor 703, 704, 705 can be applied in a single step. The biosensor may be configured in various geometric shapes that enable placement on the proximal side of the ostomy wafer and positioned to provide a boundary area 1041 around the stomal opening 702 of the ostomy wafer 701 on an adhesive layer to enable contact with peristomal skin.

FIG. 8 shows a non-limiting diagram of an exploded view of an ostomy wafer 801 with the biosensor 804 of the ostomy wafer monitoring device aligned to be positioned symmetrically on the ostomy wafer 801, combined with an absorbent layer 805 and an adhesive layer 803. The biosensor 804 integrated with the absorbent layer 805 may be adapted to allow placement by the user on the proximal adhesive side 803 of the pre-cut ostomy wafer 801 prior to fitting the wafer 801 over a stoma (not shown), where the proximal adhesive side 803 of the wafer 801 is configured to adhere to the peristomal skin. The biosensor 804 may also be applied to or embedded with or without an absorbent layer 805 during manufacture of the ostomy wafer 801 so that the wafer 801 coupled with the biosensor 804 can be applied in a single step by a user. The biosensor 804 may be formed with a stomal opening 806 at a center point. The adhesive layer 803 may be formed with a stomal opening 8061 at a center point. The stomal opening of the biosensor 806, and the adhesive layer 803 if included, is sized to allow passage of output through the stomal opening 802 of the ostomy wafer 801 and into an ostomy pouch (not shown) attached to the ostomy wafer 801 without contact with the output. The stomal opening 806 at a center point of the biosensor 804 is sized with a diameter greater than the diameter of the stomal opening 802 of the ostomy wafer 801 and adhesive layer 803 to provide a boundary area 807 on the adhesive layer 803 of the ostomy wafer 801 to contact peristomal skin. The biosensor 804 may further comprise an absorbent layer 805, positionable on an ostomy wafer adjacent to the proximal adhesive side 803 to enable direct contact of the biosensor 804 with peristomal skin. In a preferred embodiment, the biosensor 804 may be fabricated with the absorbent layer 805 as an integrated component by electrospinning nanofiber to produce the structure shown in FIG. 1 directly on to an absorbent fabric according to the disclosures of U.S. Pat. No. 11,208,735 by the same inventor hereof. In another preferred embodiment, the biosensor 804 may be fabricated by electrospinning nanofiber to produce the structure shown in FIG. 1 directly on to a collector pallet absent an absorbent according to the disclosures of U.S. Pat. No. 11,208,735. In a preferred embodiment, the biosensor may further comprise polyurethane (PU) core-shell nanofiber, and a hemicyanine-based chromogenic probe surface localized in the core-shell nanofiber. The larger nanofiber membrane (FIG. 1, 101) shares the aspects of the membrane (FIG. 1, 101) comprising at least a plurality of aligned nanofibers in each of multiple layers. The biosensor 804 may be formed by cutting in a desired geometry a shape from the nanofiber membrane (FIG. 1, 101) comprising at least three adjacent layers of nanofibers, each layer comprising a plurality of aligned nanofibers oriented at oblique angles relative to nanofibers in adjacent layers. The cut and separated biosensor 804 takes the form of a closed line shape, shown as a ring with stomal opening 806, and may also be cut as an ellipse or a polygon to adapt to and surround a stoma receiving the stomal opening 802 of an ostomy wafer 801. A separated biosensor 804 may be formed with a stomal opening 806 at a center point. The stomal opening 806 is configured to allow passage of output through the stomal opening 806 though the stomal opening 802 in the wafer 801 and into an ostomy pouch (not shown) attached to the ostomy wafer 801 without contact with the output. The biosensor 804 cut from cross a plurality of aligned nanofibers in adjacent layers at a plurality of distinct points of intersection, forming a crossing at each distinct point of intersection consisting of three crossing nanofibers extending directionally as six radials from each distinct point of intersection, where a plurality of nanofibers in each layer of the biosensor cross at relative cross-alignment angles between six radials at each distinct point of intersection in the range of 50 to 70 degrees.

In some embodiments, the biosensor 804 may further comprise an absorbent layer 805 infused with a prodrug responsive to an enzyme; the prodrug may include an antibiotic or biocide. In some embodiments, the biosensor 804 integrated with an absorbent 805 may further comprise an absorbent layer 805 infused with a prodrug responsive to at least pathogenic lipase or protease. In some embodiments, the biosensor 804 may further comprise an absorbent layer 805 infused with nanoparticles responsive to reactive oxygen species and encapsulating an antimicrobial. In some embodiments, the biosensor 804 may further comprise an absorbent layer 805 infused with an acid exhibiting antimicrobial properties. In some implementations where a wafer 801 is transparent or semi-transparent, a color-change response of the biosensor 804 is sufficiently distinct to be visible though the transparent or semi-transparent wafer 801. A color-change response of the biosensor 804 is observable when a wafer 801 is separated from the peristomal skin.

FIG. 9 shows a non-limiting diagram of the biosensor 104 of a skin barrier/wafer 901 attached to an ostomy bag 908 with a drain 909. The biosensor 104 may be positioned on the skin barrier/wafer 901 of a one-piece or a two-piece ostomy system 900. In a preferred embodiment, the biosensor 104 surrounds the stomal opening 902 of the skin barrier/wafer 901.

FIG. 10 shows a non-limiting diagram of the biosensor 104 of a skin barrier/wafer 1001 attached to a wound drainage collector pouch 1008 with a drain 1009. The biosensor 104 may be positioned on the skin barrier/wafer 1001 of a one-piece or a two-piece wound drainage collector 1000. In a preferred embodiment, the biosensor 104 surrounds the wound opening 1002 of the skin barrier/wafer 1001.

Further applications, modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Further, it is to be understood that the invention may be utilized and practiced other than as specifically described. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:
1. An ostomy wafer comprising
a chromatic nanofiber biosensor responsive to the presence of at least one pathogenic biomarker;

a unitary adhesive layer provided with a proximal surface in an axial direction configured to face a user during use;

a backing layer provided with a distal surface in an axial direction configured to face away from said user during use;

an opening having an inner radial boundary defining a stoma receiving opening;

an outer radial boundary defining a peripheral edge of said ostomy wafer;

wherein, said biosensor is positioned on said proximal surface between said inner radial boundary defining said stoma receiving opening and said outer radial boundary defining the peripheral edge of said ostomy wafer to provide a boundary area on said adhesive layer configured to contact peristomal skin, wherein, said biosensor is embedded within said adhesive layer of said ostomy wafer so that the wafer coupled with the biosensor can be applied in a single step with said biosensor positioned to be around the stoma and in direct contact with the peristomal skin, and wherein, said biosensor is adapted to provide a visual color-change indication at a critical threshold of presence when said at least one pathogenic biomarker is exposed to the biosensor.

2. The ostomy wafer of claim 1, wherein said chromatic nanofiber biosensor further comprises at least a plurality of aligned nanofibers in each of at least three multiple layers that cross a plurality of aligned nanofibers in adjacent layers at a plurality of distinct points of intersection, forming a crossing at each distinct point of intersection consisting of three crossing nanofibers extending directionally as six radials from each distinct point of intersection, where a plurality of nanofibers in each layer of the biosensor cross at relative cross-alignment angles between six radials at each distinct point of intersection in a range of 50 to 70 degrees.

3. The ostomy wafer of claim 1, wherein said biomarker is a pathogenic enzyme.

4. The ostomy wafer of claim 3, wherein said pathogenic enzyme is at least one of protease and lipase.

5. The ostomy wafer of claim 1, wherein said biosensor further comprises an absorbent layer of natural or synthetic material.

6. The ostomy wafer of claim 1, wherein said backing layer is transparent or semi-transparent and a color-change response of the biosensor is visible though said transparent or semi-transparent backing layer.

7. The ostomy wafer of claim 1, wherein said biosensor is positioned on said proximal layer so a color-change response of the biosensor is configured to be observable when said wafer is separated from the peristomal skin.

8. A method of fabricating an enzyme reactive ostomy wafer, the method comprising:

obtaining a nanofiber membrane comprising a chromogenic probe reactive to at least one pathogenic enzyme and at least three adjacent layers of nanofibers, each layer comprising a plurality of aligned nanofibers oriented at oblique angles relative to nanofibers in adjacent layers, said plurality of aligned nanofibers in each layer crossing a plurality of aligned nanofibers in adjacent layers at a plurality of distinct points of intersection, forming a crossing at each distinct point of intersection consisting of three crossing nanofibers extending directionally as six radials from each distinct point of intersection in a range of 50 to 70 degrees;

cutting in a desired geometry a shape from said nanofiber membrane in a closed line shape to form a biosensor adapted to at least in-part surround a stoma and provide a visual color-change indication when said at least one pathogenic enzyme is present and exposed to said biosensor;

obtaining an ostomy wafer providing a backing layer provided with a distal surface in an axial direction configured to face away from a user during use, and unitary adhesive layer provided with a proximal surface in an axial direction configured to face said user during use, said ostomy wafer provided with an opening having an inner radial boundary defining a stoma receiving opening and an outer radial boundary defining a peripheral edge of said ostomy wafer;

positioning and embedding said biosensor on said unitary adhesive layer between said inner radial boundary defining said stoma receiving opening and said outer radial boundary defining said peripheral edge of said ostomy wafer to provide a biosensor boundary area on said adhesive layer configured to contact peristomal skin.

9. The method of claim 8, wherein said biosensor is positioned on said proximal layer so a color-change indication of the biosensor is configured to be observable when said wafer is separated from the peristomal skin.

10. The method of claim 8, wherein said biosensor is embedded within said adhesive layer of the ostomy wafer and configured so that said wafer coupled with the biosensor can be applied in a single step and said biosensor is in direct contact with the peristomal skin.

11. The method of claim 8, wherein said geometry is a ring, an ellipse or a polygon formed with a stomal opening at a center point.

12. The method of claim 8, wherein said biosensor further comprises an absorbent layer of natural or synthetic material.

13. The method of claim 12, wherein said nanofiber membrane is formed by electrospinning said nanofiber directly onto said absorbent layer and said absorbent layer is infused with an antimicrobial to construct said biosensor.

14. The method of claim 8, wherein said backing layer is selected from transparent or semi-transparent material through which said biosensor is configured to be observable.

15. The method of claim 8, wherein said biosensor further comprises polyurethane (PU) core-shell nanofiber or analogs thereof.

* * * * *